(12) United States Patent
Nakajima et al.

(10) Patent No.: US 8,186,915 B2
(45) Date of Patent: May 29, 2012

(54) SPIRAL TAP

(75) Inventors: Takayuki Nakajima, Toyokawa (JP); Toshihiro Sato, Toyokawa (JP)

(73) Assignee: OSG Corporation, Toyokawa (JP)

( * ) Notice: Subject to any disclaimer, the term of this patent is extended or adjusted under 35 U.S.C. 154(b) by 1135 days.

(21) Appl. No.: 11/990,686

(22) PCT Filed: Apr. 26, 2007

(86) PCT No.: PCT/JP2007/059109
§ 371 (c)(1),
(2), (4) Date: Feb. 20, 2008

(87) PCT Pub. No.: WO2008/136123
PCT Pub. Date: Nov. 13, 2008

(65) Prior Publication Data
US 2009/0214311 A1    Aug. 27, 2009

(51) Int. Cl.
*B23G 5/06* (2006.01)
(52) U.S. Cl. .......................... 408/222; 470/198
(58) Field of Classification Search ............ 408/215, 408/216, 219, 222; 470/198; *B23G 5/06*
See application file for complete search history.

(56) References Cited

U.S. PATENT DOCUMENTS

| 4,389,145 | A * | 6/1983 | Capuano ...................... 408/1 R |
| 5,316,520 | A * | 5/1994 | Green ............................... 470/18 |
| 6,217,267 | B1 * | 4/2001 | Sugano et al. ................. 408/222 |
| 6,685,573 | B2 * | 2/2004 | Hikosaka et al. ............. 470/204 |
| 6,840,718 | B2 * | 1/2005 | Newmark ....................... 408/119 |
| 7,147,413 | B2 * | 12/2006 | Henderer et al. ............. 408/144 |
| 7,815,512 | B2 * | 10/2010 | Nakajima et al. ............. 470/204 |
| 7,950,880 | B2 * | 5/2011 | Henderer et al. ............. 408/222 |
| 2003/0118411 | A1 * | 6/2003 | Flynn et al. ..................... 407/53 |
| 2004/0105730 | A1 * | 6/2004 | Nakajima ....................... 408/222 |
| 2005/0042049 | A1 | 2/2005 | Schwarz |
| 2005/0187026 | A1 * | 8/2005 | Henderer et al. ............. 470/198 |
| 2010/0260566 | A1 * | 10/2010 | Glimpel et al. ................ 408/222 |
| 2010/0260568 | A1 * | 10/2010 | Osawa ............................ 409/74 |

FOREIGN PATENT DOCUMENTS

| JP | U 51-14393 | 2/1976 |
| JP | A 54-2476 | 2/1979 |
| JP | A 2001-353623 | 12/2001 |
| JP | A 2002-292521 | 10/2002 |

(Continued)

OTHER PUBLICATIONS

Dec. 25, 2009 Office Action issued in Chinese Patent Application No. 2007800011095 (with translation).

(Continued)

*Primary Examiner* — Eric A Gates
(74) *Attorney, Agent, or Firm* — Oliff & Berridge, PLC

(57) ABSTRACT

A helical flute has a constant lead part and a gradually increased lead part. The constant lead part has an axial length ranging from 0.3×LA to 1.2×LA and includes at least entirety of a leading part, so that the cutting performance of a cutting edge at the leading part and shape of chips (curled shape, etc.) are stable. In the constant lead part, because a lead is the smallest and a helix angle is large, a rake angle of the cutting edge is large, so that an excellent cutting quality is obtained and the chips become curled well. Meanwhile, in the gradually increased lead part, because of the lead gradually increased toward a shank, the chips are rapidly discharged toward the shank.

6 Claims, 8 Drawing Sheets

FOREIGN PATENT DOCUMENTS

| | | |
|---|---|---|
| JP | A 2003-145353 | 5/2003 |
| JP | A-2006-255862 | 9/2006 |
| KR | 10-2005-0010707 A | 1/2005 |
| RU | 2021085 C1 * | 10/1994 |

OTHER PUBLICATIONS

"Development of spiral tap having large diameter," Tool Technique, Sep. 2005, pp. 63-64.

* cited by examiner

CONSTANT LEAD (No2)

CHANGE TO SMALL (No3)

CHANGE TO LARGE LEAD (No10)

FIG.6

| Test sample | Thread tip end part | | Flute terminal part | | Variation proportion of lead | Presence/absence of constant lead part | Length of constant lead part | Taper/chamfer | Number of full ridges | Results |
|---|---|---|---|---|---|---|---|---|---|---|
| | Lead ($L_a$) | Helix angle | Lead | Helix angle | | | | | | |
| No. 1 | 30mm | 40° | — | — | 1.0$L_a$ | Present | Entirely | None | 7.5 ridges | Tap broke at 35th hole. |
| No. 2 | 30mm | 40° | — | — | 1.0$L_a$ | Present | Entirely | Taper | 3 ridges | Tap broke at 44th hole. |
| No. 3 | 30mm | 40° | 24mm | 46° | 0.8$L_a$ | Present | 0.5$L_a$ | Taper | 3 ridges | Tap broke at 28th hole. |
| No. 4 | 30mm | 40° | 33mm | 37° | 1.1$L_a$ | Present | 0.5$L_a$ | Taper | 3 ridges | Tap broke at 78th hole. |
| No. 5 | 30mm | 40° | 36mm | 35° | 1.2$L_a$ | Present | 0.5$L_a$ | Taper | 3 ridges | Tapping continued more than 500 holes. |
| No. 6 | 30mm | 40° | 45mm | 29° | 1.5$L_a$ | Present | 0.8$L_a$ | Taper | 0.5 ridges | Internal thread enlarged in 1st hole. |
| No. 7 | 30mm | 40° | 45mm | 29° | 1.5$L_a$ | Present | 0.5$L_a$ | Taper | 3 ridges | Tapping continued more than 500 holes. |
| No. 8 | 30mm | 40° | 45mm | 29° | 1.5$L_a$ | Absent | None | Taper | 3 ridges | Tap broke at 9th hole. |
| No. 9 | 30mm | 40° | 45mm | 29° | 1.5$L_a$ | Present | 0.2$L_a$ | Taper | 3 ridges | Tap broke at 8th hole. |
| No. 10 | 30mm | 40° | 45mm | 29° | 1.5$L_a$ | Present | 0.5$L_a$ | Taper | 3 ridges | Tapping continued more than 500 holes. |
| No. 11 | 30mm | 40° | 45mm | 29° | 1.5$L_a$ | Present | 0.8$L_a$ | Taper | 3 ridges | Tapping continued more than 500 holes. |
| No. 12 | 30mm | 40° | 60mm | 22.7° | 2.0$L_a$ | Present | 0.8$L_a$ | Taper | 3 ridges | Tapping continued more than 500 holes. |
| No. 13 | 30mm | 40° | 45mm | 29° | 1.5$L_a$ | Present | 1.3$L_a$ | Taper | 3 ridges | Tap broke at 47th hole. |
| No. 14 | 30mm | 40° | 45mm | 29° | 1.5$L_a$ | Present | 0.5$L_a$ | Taper | 4.5 ridges | Tapping continued more than 500 holes. |
| No. 15 | 35mm | 40° | 45mm | 29° | 1.5$L_a$ | Present | 0.5$L_a$ | Taper | 5 ridges | Tap broke at 497th hole. |
| No. 16 | 25mm | 45° | 50mm | 26.7° | 2.0$L_a$ | Present | 0.5$L_a$ | Chamfer | 3 ridges | Tapping continued more than 500 holes. |

CHIP IN SAMPLE (No7) OF PRESENT INVENTION

CHIP IN SAMPLE (No8) OF CONVERTIONAL ART

SPIRAL TAP

TECHNICAL FIELD

The present invention relates to a spiral tap, and particularly it relates to an improvement of a spiral tap which discharges chips toward a shank via a helical flute.

BACKGROUND ART

Spiral taps are used widely as tools for forming internal thread. (a) The spiral tap includes a thread part being provided with an external thread corresponding to an internal thread to be worked, a helical flute(s) dividing the external thread, and a cutting edge(s) formed along the helical flute. (b) By screwing the thread part into a prepared hole formed in a workpiece, the cutting edge cuts i.e., forms the internal thread on an inner circumferential surface of the prepared hole. At the same time, chips are discharged toward a shank via the helical flute.

The example of such spiral tap is described in Patent Gazette 1. A lead of the helical flute gradually increases from a tip end of the thread part to a flute terminal part positioned at side of a shank. A helix angle is small at the tip end part at which the lead is small. Accordingly, a rake angle of the cutting edge is large at the leading part positioned at the tip end to thereby provide an excellent cutting quality and to make the chip to be curled well. Meanwhile, at side of the shank where the lead is large, the chips are discharged rapidly toward side of the shank with guided by the helical flute so that a chip clogging is suppressed satisfactorily.

Patent Gazette 1: Japanese Utility Model Examined Publication No. S54-2476

However, the conventional spiral tap with the helical flute having the gradually increased lead has following problem. That is, because the lead of the helical flute, that is the helix angle varies even at the leading part that cuts the internal thread, the cutting quality and the shape of chips (curled shape, etc.) varies depending on position in the helical flute. Consequently, the cutting performance and the chip discharge performance become unstable, so that the spiral tap may be broken at an early stage due to the chip clogging depending on the working i.e., processing conditions.

DISCLOSURE OF THE INVENTION

The present invention has been made with the above circumstances as a background, and an object thereof is to stably obtain, in a spiral tap provided with a helical flute with a varying lead, an excellent cutting performance and chip discharge performance.

For achieving the above object, the first aspect of the present invention is featured by (a) (i) a spiral tap includes a thread part being provided with an external thread corresponding to an internal thread to be worked, a helical flute dividing the external thread, and a cutting edge formed along the helical flute. (ii) When the thread part is screwed into a prepared hole formed in a workpiece, the cutting edge cuts the internal thread on an inner circumferential surface of the prepared hole, and chips is discharged toward a shank via the helical flute. (b) (i) The helical flute is formed with a constant lead LA in a constant lead part provided at a tip end, and it is connected smoothly to the constant lead part with a lead gradually increased to be not less than 1.2×LA at a flute terminal part, in a gradually increased lead part extending from the constant lead part to a flute terminal at side of the shank. (ii) The constant lead part has, in an axial length thereof ranging from 0.3×LA to 1.2×LA, includes at least entirety of a leading part of the thread part.

The second aspect is featured by, in the spiral tap of the first aspect, that (i) the constant lead part is worked by rotating a tap blank about an axis O thereof at a constant rotation speed Vr with moving the tap blank at a constant feeding speed Vf in an axial direction thereof relative to a grinding abrasive oriented to intersect the axis O of the tap blank by a constant inclination angle α, and (ii) the gradually increased lead part is worked by varying the feeding speed Vf of the tap blank relative to the rotation speed Vr so that the lead gradually increases toward the flute terminal part with a flute width increased toward the flute terminal part, relative to the grinding abrasive in the orientation intersecting the axis O by the same inclination angle α as that during working of the constant lead part.

The third aspect is featured by, in the spiral tap of the first or second aspect, that the thread part includes the leading part, a full thread part succeeding to the leading part and having more than one ridge and not more than five ridges, and a tapered part in which ridges of the external thread are removed from the full thread part toward the shank in a tapering manner to be decreased in diameter.

The fourth aspect is featured by, in the spiral tap of the first or second aspect, that (i) the full thread part of the thread part is provided with a chamfer part, with leaving a leading part side thread part disposed at the tip end succeeding to the leading part and having more than one ridge and not more than five ridges. (ii) The chamfer part is provided on a rake surface of the cutting edge at a shank side thread part positioned to side of the shank than the leading part side thread part, to be retreated in a circumferential direction toward a crest of the ridges.

With this spiral tap, the helical flute has the constant lead part at side of the tip end thereof, and the gradually increased lead part which gradually increases in the lead. Because the constant lead part includes at least entirety of the leading part in the axial length ranging from 0.3×LA to 1.2×LA, not only the cutting performance of the cutting edge becomes stable but the shape of chips (curled shape, etc.) at the leading part become stable. Also, with the constant lead part in which the lead is smallest and the helix angle is large, the rake angle of the cutting edge is large, thus rendering an excellent cutting quality and making the chips to be curled well. Furthermore, with the gradually increased lead part in which the lead increases gradually toward the shank, the chips are rapidly discharged toward the shank to suppress the chip clogging satisfactorily. That is, presence of the constant lead part highly stabilizes the excellent cutting performance and chip discharge performance rendered by the gradually increased lead. Consequently, the cutting torque is reduced, which suppresses breakage of the spiral tap, etc. to further improve the durability thereof.

With the spiral tap according to the second aspect of the present invention, both the constant lead part and the gradually increased lead part of the helical flute, are worked by the grinding abrasive being oriented to intersect the axis O of the tap blank by the constant inclination angle α. Accordingly, in comparison to a case where the orientation of the grinding abrasive is varied depending on the variation of the lead, the helical flute can be worked simply and cheaply. In addition, in the gradually increased lead part, increase of the flute width toward the flute terminal part positioned at side of the shank widens a space for the chip, so that the chip clogging is suppressed more effectively.

The spiral tap according to the third aspect of the present invention has the tapered part, at which the ridges of the external thread are removed in a tapering manner so that the diameter thereof decreases from the full thread part having 1 to 5 ridges toward the shank. Thus, at the tapered part, a predetermined gap is formed between the outer peripheral surface thereof and a valley of the internal thread, which suppresses biting-in of the chips when the tapered part is screwed into the threaded hole formed by the leading part, succeeding to or continuing from the full thread part. In addition, chipping i.e., small breakage of the cutting edge, increase of the required cutting torque, and breakage of the spiral tap, etc., all caused by the biting-in of chips generated are suppressed to thereby further improve the durability of the spiral tap.

The full thread part of the full thread shape has more than one (1) ridge and not more than five (5) ridges. At the tapered part, foot parts remained after the removal of the ridges of external thread have the same shape as the original ridges. Accordingly, owing to the excellent guiding action (lead feeding) of the full thread part and the tapered part, the internal thread can be cut in a high working precision.

With the spiral tap according to the fourth aspect of the present invention, the chamfer part is formed on the rake surface of the cutting edge of the shank side thread part which, among the full thread part of the thread part, is positioned at side of the shank. For this reason, the chips are readily pushed out to an outer circumference along i.e., via the chamfer part, so that the biting-in of chips during the screwing of the full thread part into the threaded hole formed by the leading part is suppressed. Thus, chipping of the cutting edge, increase of the cutting torque, and breakage of the spiral tap etc., all caused by the biting-in of chips are suppressed. In particular, increased strength of the cutting edge owing to the chamfer part prevents chipping of the cutting edge more effectively, together with suppression of the biting-in of chips. The durability of the spiral tap is thereby further improved.

Also, of the full thread part of the thread part, the leading part side thread part which is a tip part succeeding to the leading part and has more than 1 ridge and not more than 5 ridges, has the original full thread shape. The ridges of the shank side thread part provided with the chamfer part, can be kept in the original ridge shape at a part except for the cutting edge. Thus, an excellent guiding action (lead feeding) is rendered by the entire area of the full thread part, which contributes to the cutting of the internal thread in the high working precision.

BEST MODE FOR CARRYING OUT THE INVENTION

With the spiral tap according to the present invention, the chips are discharged toward side of the shank. Specifically, there is a case where the cutting is performed by rotatingly driving a spiral tap having cutting edges provided along a right-handed helical flutes in a clockwise direction, and a spiral tap having cutting edges provided along left-handed helical flutes in a counterclockwise direction, as viewed from the shank side. Although such spiral taps are used favorably to cut the internal thread in a blind hole, it can be used to cut the internal thread in a through hole.

The spiral tap can be made of various tool materials, such as high-speed tool steel, cemented carbide, etc. Also, a hard film of TiAlN, TiN, or TiCN, etc., can be coated as necessary. The spiral tap according to the present invention exhibits the excellent effects in performing cutting using a water-soluble cutting oil or minimum quantity lubrication (MQL), performing a dry cutting without use of the cutting oil, and other cases where due to poor cutting quality the chips tend to extend readily and undergo irregular movement. The spiral tap according to the present invention is of course applicable to wet working in which a tapping (cutting of the internal thread) is performed with supplying the lubricating oil sufficiently.

The helix angle of the helical flute formed on the thread part preferably ranges, for example, from 15° to 50° in view of both the cutting performance and chip discharge performance. The helix angle is greatest in the constant lead part, and it is suitably ranges from 30° to 50°, and preferably ranges from 35° to 45°. The helical flute is not necessarily provided only in the thread part, but may reach a neck part or the shank part, past the thread part. The number of cutting edges varies depending on the material to be cut, i.e., a cut material and the tap size, for example, favorably being in the range of two to six.

The constant lead part is determined in length in an axial direction, that is axial length so that it includes at least entirety of the leading part. As long as the axial length ranges from 0.3×LA to 1.2×LA, the constant lead part may reach i.e., extend the neck part, etc. including the entire thread part.

With the second aspect according to the present invention, both the constant lead part and the gradually increased lead part of the helical flute are ground by the grinding abrasive being oriented to intersect the axis O of the tap blank by the constant inclination angle α. In carrying out the first aspect of the present invention, the helical flute may be ground while varying the orientation of the grinding abrasive depending on the variation of the lead. In this case, the flute width can be made substantially constant regardless of the variation of the lead. The orientation (inclination angle α) of the grinding abrasive may also be arbitrarily varied to arbitrarily vary the flute width of the helical flute.

Although the constant lead part and the gradually increased lead part are preferably worked by the grinding abrasive, other working technique such as an extrusion may be employed instead therefor. In forming the lead parts using the grinding abrasive, etc., for example, the tool is moved relative to the tap blank from the tip end toward the shank, after formation of the constant lead part, so that the gradually increased lead part can be formed succeeding thereto. However, it is also possible to form after formation of the gradually increased lead part the constant lead part in continuation thereafter in a reversed order, by moving the tool relative to the blank from the shank toward the tip end. The working methods and the manufacturing methods are determined as suited, that is for example the constant lead part and the gradually increased lead part may also be worked in separate steps using separate tools.

In the gradually increased lead part, the lead, that is, the helix angle sufficiently varies gradually, and it may be varied in multiple stages within a range such that the discharge performance is not degraded due to catching of chips at an intermediate area, etc. However, in this case it is preferable to vary the lead in a smooth and continuous manner, such as in a linear manner, that is at a constant variation rate in the axial direction.

With the third and fourth aspect of the present invention, the tapered part is provided at the shank side part of the full thread part, or a chamfer part is provided at the rake surface of the cutting edge. However, in carrying out the first or second aspect of the present invention, various modes may be applied, that is a tapered part or chamfer part is not necessarily required, or removing the thread at a constant height instead for cutting it in the tapering manner.

With regard to the full thread part of the third aspect of the present invention and the leading part side thread part of the fourth aspect of the present invention, following should be noted. If the number of ridges is not more than 1, the spiral tap cannot be guided (lead fed) in the high precision, while if the number of ridges exceeds 5, the biting-in of chips tends to occur readily, which causes the chipping of the cutting edge or breakage of the spiral tap. For this reason, the number of ridges is preferably selected to be more than 1 but not more than 5. The number of ridges at the tapered part of the third aspect of the present invention or the shank side thread part of the fourth aspect of the present invention is so selected that the total number of ridges, including the ridges at the full thread part or the leading part side thread part, is for example not less than 5 and preferably not less than 7. In the tapered part or the shank side thread part alone, the number of ridges is preferably not less than 3 to obtain a predetermined guiding action (lead feeding).

With the fourth aspect of the present invention, the chamfer height Hmen of the chamfer is suitably selected, for example, to range from 15% to 100% of the thread height Hneji at the full thread part. The chamfer height Hmen is a dimension in a radial direction measured based on a tip end (outer circumferential edge) of the cutting edge before chamfering. The chamfer part may be formed as a flat planar chamfer or as a rounded chamfer of arcuate shape.

BRIEF DESCRIPTION OF THE DRAWINGS

FIG. 6 is a table for explaining specifications of 16 kinds of test samples including samples according to the present invention, and results of a durability test conducted using these test samples;

BEST MODE FOR CARRYING OUT THE INVENTION

Embodiments of the present invention will now be described in detail with reference to the drawings.

Figure 1A:
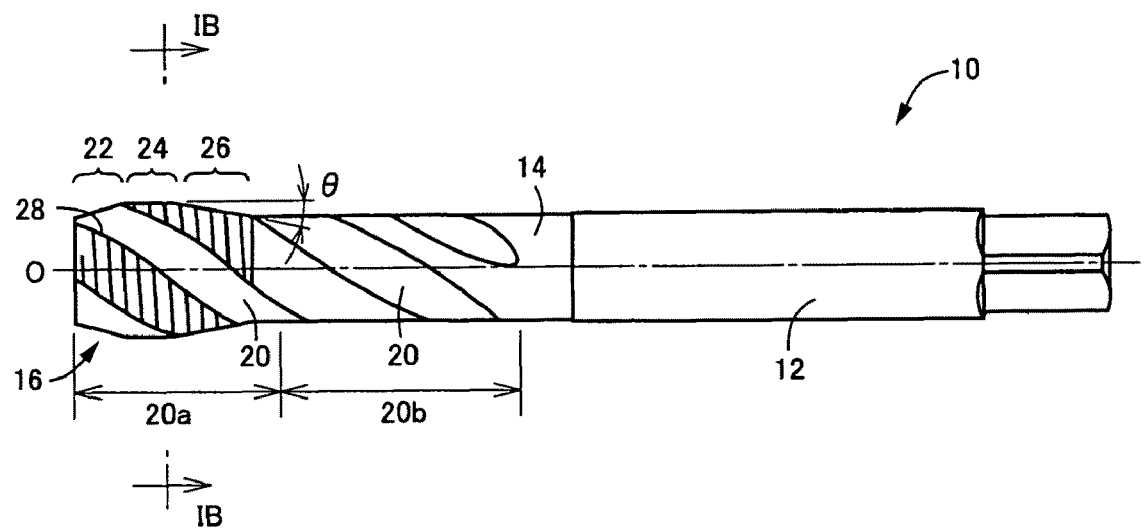
FIG. 1 shows a spiral tap that is one embodiment according to the present invention, with FIG. 1A being a front view and FIG. 1B being an enlarged view of a sectional view taken on line IB-IB of FIG. 1A.
Figure 1B:
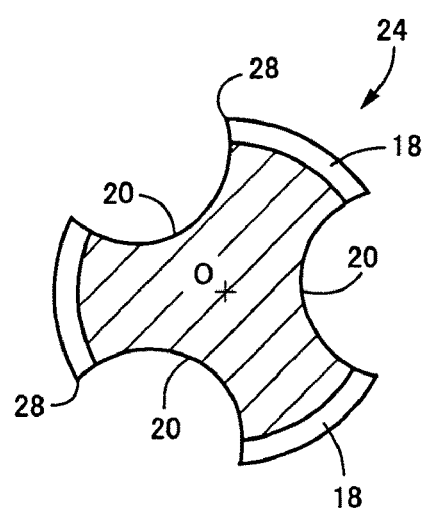

FIG. 1 is a set of diagrams of a three-blades type spiral tap 10 that is one embodiment according to the present invention, with FIG. 1A being a front view as viewed from a direction perpendicular to an axis O, and FIG. 1B being an enlarged view of a sectional view taken on line IB-IB of FIG. 1A. The spiral tap 10 integrally has a shank 12, a neck part 14, and a thread part 16 disposed in the named order along the common axis O. The thread part 16 is provided with an external thread of thread groove shape that corresponds to an internal thread to be worked, and three helical flutes 20 that are formed at equal intervals around the axis O so as to divide the external thread.

The thread part 16 has a leading part 22, a full thread part 24 and a tapered part 26. Of these, in the leading part 22 positioned at side of a tip end, ridges 18 of the external thread are cut i.e., removed in an axial direction in a tapering manner. The full thread part 24 has ridges 18 of full shapes provided succeeding to or continuing from the leading part 22. At the tapered part 26, the ridges 18 are cut in a tapering manner so that diameter thereof decreases from the full thread part 24 toward the neck part 14. Cutting edges 28 are formed at ridge lines formed between the full thread part 24 etc. and the helical flutes 20.

The number of ridges at the entire thread part 16 is preferably selected to be not less than 7, and is selected to be approximately 10 in the present embodiment. The number of ridges at the leading part 22 is preferably selected to be not less than 2 and is selected to be approximately 2.5 in the present embodiment. The number of ridges at the full thread part 24 is preferably selected to range from 1 to 5 and is selected to be approximately from 1.5 to 4.5 in the present embodiment. The remaining part corresponds to the tapered part 26.

The inclination angle θ (half (½) of a tapered angle) of the tapered part 26 with respect to the axis O is determined suitably depending on the axial length of the tapered part 26 so that at a rear end part of the thread part 16 (boundary between the thread part 16 and the neck part 14), the ridges 18 are removed completely, that is the thread part 16 coincides with the neck part 14 in the diameter. The inclination angle θ is selected to be approximately 4.5° in the present embodiment.

Figure 3:
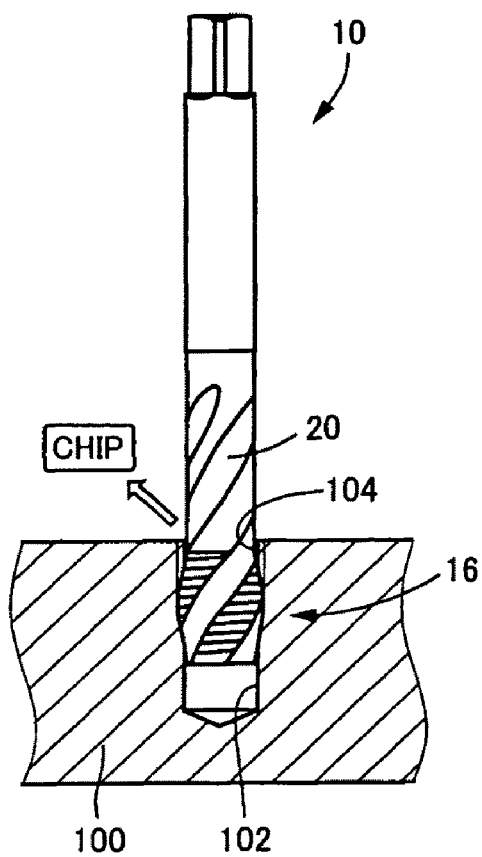
FIG. 3 is a sectional view showing a state where the spiral tap of FIG. 1 is screwed into a prepared hole formed in a workpiece for tapping.

Each of the helical flutes 20 of a right-handed helix is formed beyond the thread part 16 over substantially the entirety of the neck part 14. The spiral tap 10 is screwed from the tip end side into a prepared hole 102 in a workpiece 100, as shown for example in FIG. 3, with driven to rotate clockwise as viewed from side of the shank 12. The spiral tap 10 cuts or forms an internal thread 104 on an inner circumferential surface of the prepared hole 102, and discharges the chip toward the shank 12 via the helical flutes 20. The helical flute 20 is formed to have a constant lead LA in a constant lead part 20a positioned at the tip end side of the spiral tap.

In a gradually increased lead part 20b extending from the constant lead part 20a to a flute terminal, the lead increases continuously at a constant variation rate in the axial direction. This is to connect the gradually increased lead part 20b with the constant lead part 20a smoothly, and to make the lead not less than 1.2×LA at the flute terminal part. The constant lead part 20a has an axial length ranging from 0.3×LA to 1.2×LA with respect to the lead LA and includes at least the entire leading part 22 of the thread part 16. In the present embodiment, the constant lead part 20a includes the entire thread part 16, reaching the neck part 14.

A helix angle of each helical flute 20 in the constant lead part 20a preferably ranges from 35° to 45°, and is selected to be proximately 40° in the present embodiment. In the gradually increased lead part 20b, the helix angle decreases smoothly and continuously in accordance with the variation of the lead. However, in order to ensure a predetermined chip discharge performance, the helix angle of the helical flute 20 is maintained in the angle not less than 15° even at the flute terminal part.

Figure 2:
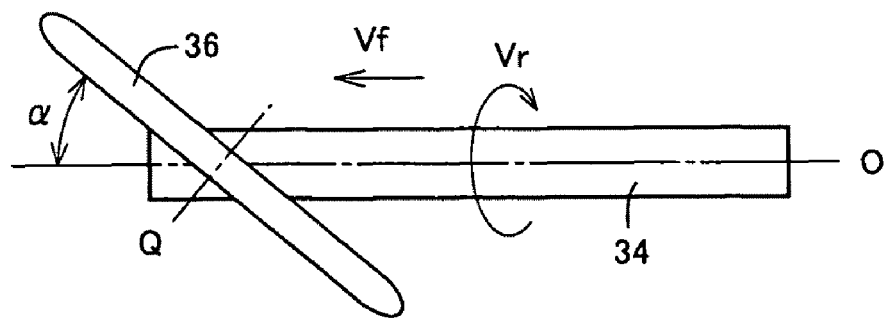
FIG. 2 is a diagram for explaining a working method for cutting a helical flute of the spiral tap of FIG. 1.

Such helical flutes 20 are ground by an outer peripheral surface of a grinding abrasive 36 positioned in an orientation i.e., posture to intersect the axis O of a tap blank 34 by a predetermined inclination angle α in plan view as shown for example in FIG. 2. That is, the grinding abrasive 36 is rotated about a central line Q, and the tap blank 34 is rotated about the axis O with being moved in an axial direction relative to the grinding abrasive 36. Thus, the helical flutes 20 are ground by the outer peripheral surface of the grinding abrasive 36.

Specifically, for the constant lead part 20a, the grinding abrasive 36 is positioned to intersect the axis O of the tap blank 34 by the predetermined inclination angle α corresponding to the helix angle (for example 40° which is the same angle as the helix angle). The grinding abrasive 36 is sufficiently rotated about the axis O at a constant rotation speed Vr, and the tap blank 34 is moved in the axial direction at a constant feed speed Vf corresponding to the constant lead LA.

For the gradually increased lead part 20b, the feeding speed Vf is varied smoothly and continuously relative to the rotation speed Vr, so that the lead increases smoothly and continuously toward the flute terminal part. Here, upon cutting the helical flute 20, the grinding abrasive 36 is varied in the orientation (inclination angle α) thereof in accordance with the variation of the lead, so that the flute width and the cross-sectional shape of the flute can be kept substantially constant, regardless of the variation of the lead.

However, with the present embodiment, the lead is varied by varying the feeding speed Vf relative to the rotation speed Vr while maintaining the grinding abrasive 36 in a constant orientation intersecting the axis O by the same inclination angle α as that during the forming of the constant lead part 20a. Thus, as the lead increases gradually toward the flute terminal part, the flute width of the helical flute 20 increases due to an interference cutting by the grinding abrasive 36.

Figure 4A:
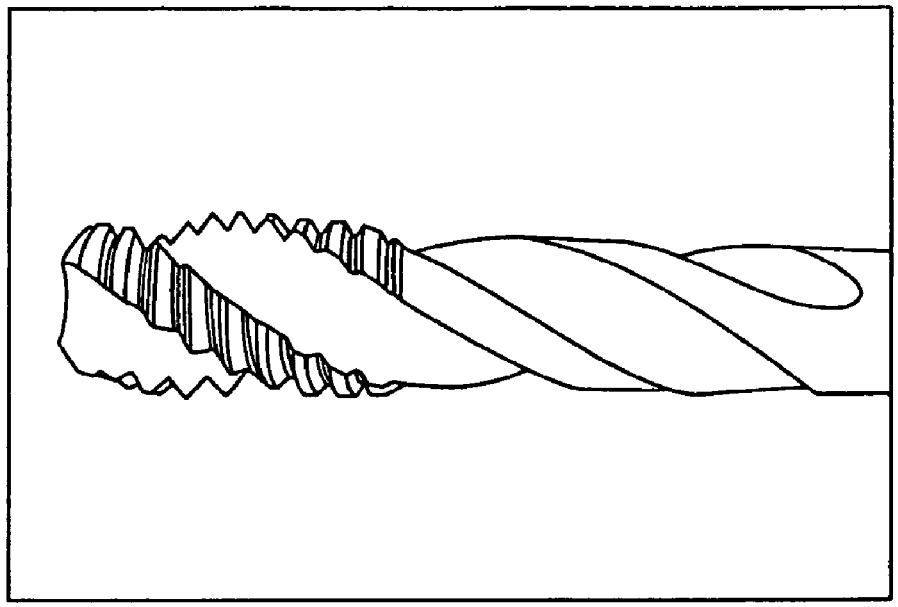
FIG. 4 is a set of photographs comparatively showing outer shapes of helical flutes of cases where the lead of the helical flute is made constant, gradually decreased, and gradually increased in cutting the helical flute by the working method of FIG. 2.
Figure 4B:
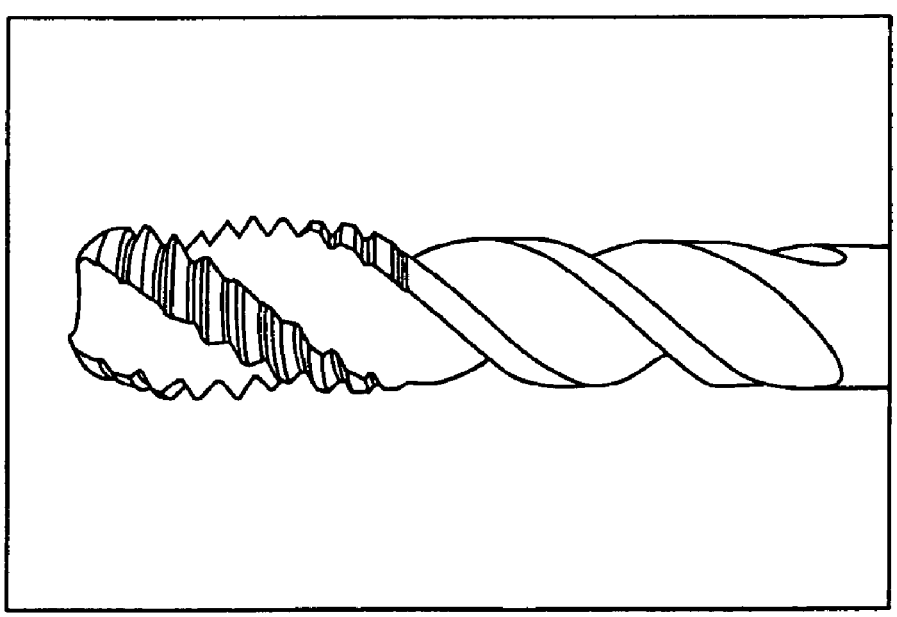
Figure 4C:
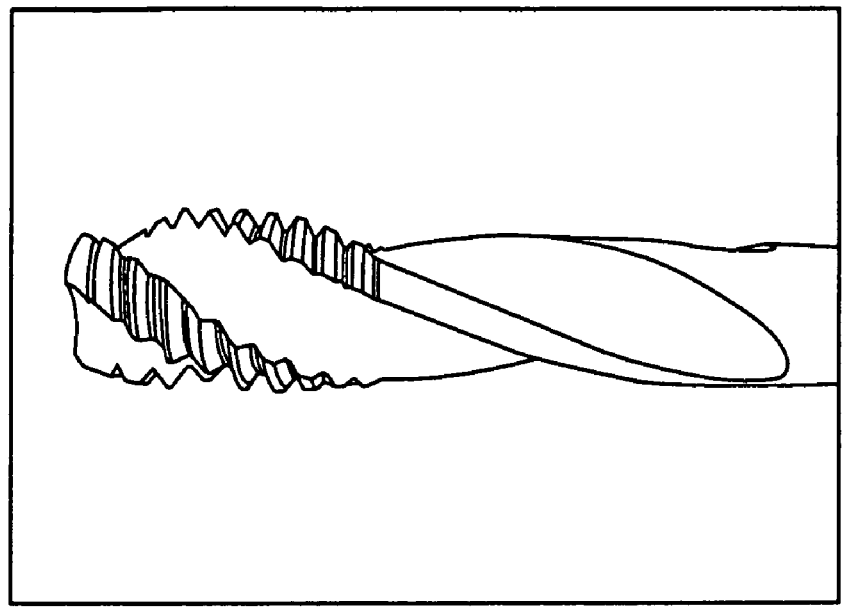

FIG. 4 is a set of photographs of spiral taps 10 in which the helical flutes 20 are cut while keeping the orientation (inclination angle α) of the grinding abrasive 36 constant in the above-described manner. FIG. 4A shows a conventional sample with the constant lead, FIG. 4B shows a comparative sample with the gradually decreased lead, and FIG. 4C shows a sample according to the present invention with the gradually increased lead. The flute width is constant in the conventional sample of FIG. 4A, but increases toward the shank 12 in both the comparative sample of FIG. 4B and the sample according to the present invention of FIG. 4C in which the leads vary. The taps of FIGS. 4A to 4C correspond respectively to test samples No. 2, No. 3, and No. 10 in a Table shown in FIG. 6 to be described later.

In the working of such a helical flute 20, for example, the grinding abrasive 36 is moved relative to the tap blank from the tap tip end toward the shank 12, so that the gradually increased lead part 20b is worked continuously after forming the constant lead part 20a. Noted however that the constant lead part 20a may be worked continuously after forming the gradually increased lead part 20b by reversely moving the grinding abrasive 36 in a relative manner from side of the shank 12 toward the tip end.

The spiral tap 10 according to the present embodiment is made of high-speed tool steel (powder high-speed tool steel), and is coated a hard coating film of TiCN on the thread part 16. Also, as shown in FIG. 1B, the ridge 18 of the full thread part 24 is constant in diameter up to a heel is provided with no relief. However, the relief such as an eccentric relief is provided as necessary. The ridges 18 of the leading part 22 are provided with a predetermined relief.

Figure 5A:
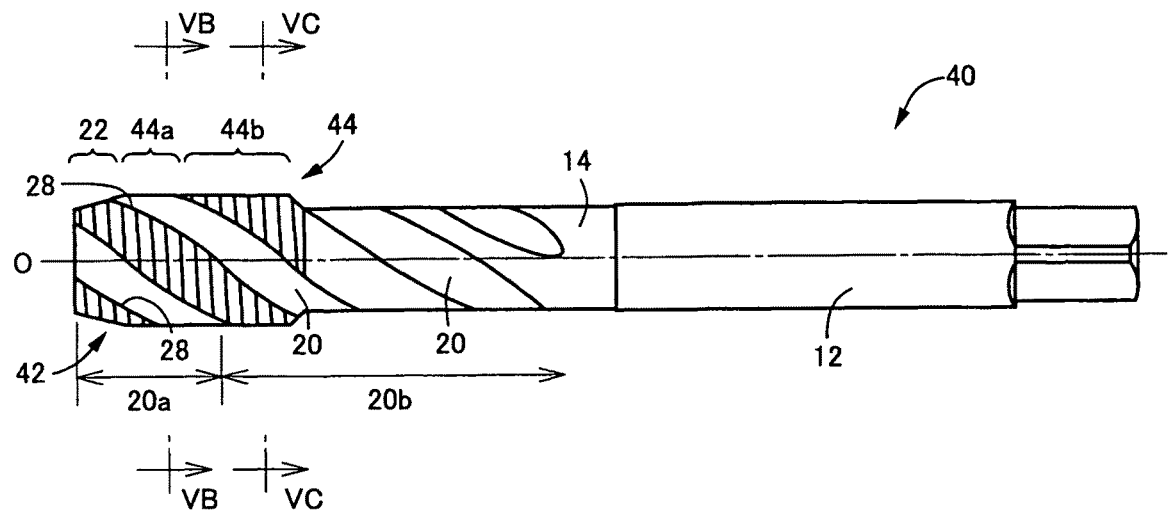
FIG. 5 is a set of diagrams for explaining another embodiment according to the present invention where chamfer part is provided to cutting edges of a partial full thread part, with FIG. 5A being a front view, FIG. 5B being an enlarged view of a sectional view taken on line VB-VB of FIG. 5A, and FIG. 5C being an enlarged view of a sectional view taken on line VC-VC of FIG. 5A.
Figure 5B:
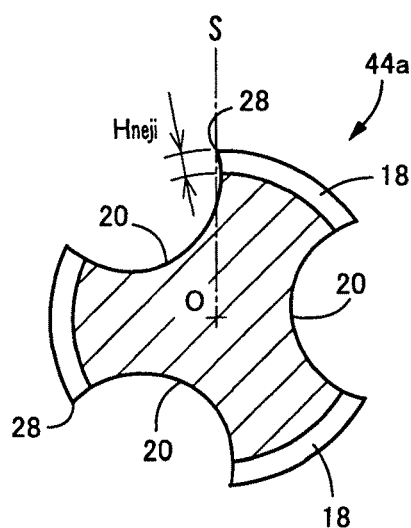
Figure 5C:
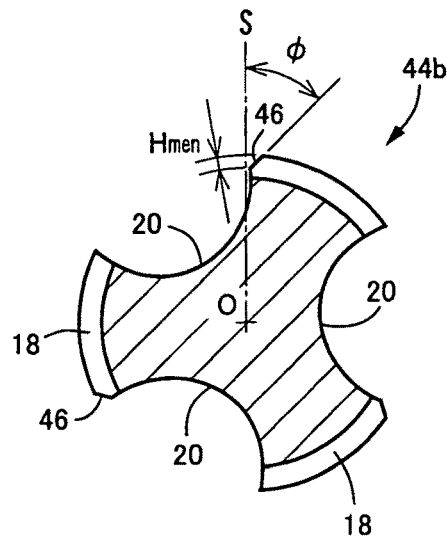

Similar to the spiral tap 10, a spiral tap 40 according to another embodiment of the present invention shown in FIG. 5 has three cutting blades and three helical flutes 20, so that the cutting edges 28 are formed along the helical flutes 20. The helical flute 20 is constituted of the constant lead part 20a and the gradually increased lead part 20b. However, a thread part 42 not provided with the tapered part 26, is constituted of only the leading part 22 and a full thread part 44. FIG. 5A is a front view as viewed in a direction perpendicular to the axis O, FIG. 5B is an enlarged view of a sectional view taken on line VB-VB of FIG. 5A, and FIG. 5C is an enlarged view of a sectional view taken on line VC-VC of FIG. 5A.

The full thread part 44 includes a leading part side thread part 44a and a shank side thread part 44b. The leading part side thread part 44a is disposed at side of the tip end in continuation from the leading part 22 and has more than 1 ridge and not more than 5 ridges. The shank side thread part 44b is positioned at side of the shank 12. With leaving the leading part side thread part 44a, a chamfer part 46 is formed on a rake surface (part of the helical flute 20) of the cutting edge 28. This chamfer part 46 is retreated in a circumferential direction (the heel side) toward a crest, i.e., the outer circumference of the external thread or ridges 18.

FIG. 5B is a sectional view at the leading part side thread part 44a provided with no chamfer part 46, and FIG. 5C is a sectional view at the shank side thread part 44b provided with chamfer part 46. The chamfer part 46 has a chamfer height Hmen that ranges from 15% to 100% of a thread height Hneji at the full thread part 44, and is set for example at approximately 50%. The chamfer height Hmen is a dimension measured in a radial direction of the cutting edge 28 based on the tip end (outer circumferential edge) before being chamfered. The thread height Hneji is a dimension in the radial direction measured from a valley bottom to the crest of the thread 18, and is specifically defined as "(tap outer diameter−tap valley diameter)/2."

The chamfer part 46 is a flat and planar chamfer. A chamfer angle φ with respect to a base line S connecting the tip end (outer circumferential edge) of the cutting edge 28 before chamfering and the tap axis O, ranges from 20° to 60°, and is selected for example in approximately 45°. In FIG. 5C, the chamfer angle φ is indicated in a cross section perpendicular to the axis O. However, strictly speaking, the chamfer angle is the angle measured in a cross section perpendicular to the cutting edge 28 at the crest part formed along the helical flute 20, and it is selected in the range of 20° to 60°. In the present embodiment, both the chamfer height Hmen and the chamfer angle φ have a constant dimension and a constant angle over the entire shank side thread part 44b.

The total number of ridges of the thread part 42 is preferably selected to be not less than 7, and is set to approximately 15 to 20 in the present embodiment. The number of ridges of the leading part 22 is preferably selected to be not less than 2, and is set to 2.5 in the present embodiment. The number of ridges in the leading part side thread part 44a ranges from 1 to 5 ridges. The remaining part of the thread part 42 constructs the shank side thread part 44b. The spiral tap 40 is also made of high-speed tool steel (powder high-speed tool steel), and is coated a hard coating film of TiCN on the thread part 42. The ridges 18 of the full thread part 44 are provided with relieves such as an eccentric relief as necessary.

As shown in a Table of FIG. 6, sixteen (16) kinds of test samples No. 1 to No. 16 including samples according to the present invention are prepared for testing. These samples are tested or examined the durability thereof by being tapped under the testing conditions given below. The test samples No. 1 to No. 15 have the same basic structure as that of the spiral tap 10 shown in FIG. 1, and the test sample No. 16 has the same basic structure as that of the spiral tap 40 shown in FIG. 5.

<Testing conditions>

| | |
|---|---|
| Size: | M8 × 1.25 |
| Leading part: | 2.5 ridges |
| Thread part length of tap: | 10 ridges (for No. 1 to No. 15) |
| | 17.6 ridges (for No. 16) |
| Cut material: | SUS 304 |
| Cutting speed: | 8 m/min (for No. 1 to No. 15) |
| | 10 m/min (for No. 16) |
| Prepared hole shape: | Blind hole, φ6.8 × 25 mm |
| Tapping length: | 16 mm (for No. 1 to No. 15) |
| | 12 mm (for No. 16) |
| Cutting oil: | Water-soluble cutting oil |
| Machine used: | Horizontal machining center |

In FIG. 6, in column of "Thread tip end part" and "Flute terminal part", the respective leads and the respective flute angles of the helical groove 20 at the tap tip end part and at the flute terminal part at side of the shank 12 are indicated. The proportion of the lead of the "Flute terminal part" relative to the lead LA at the "Thread tip end part" is indicated in the column of "Variation proportion of lead". The type and presence/absence of the tapered part 26 and the chamfer part 46 are indicated in the column of "Taper/chamfer", the number of ridges of the full thread part 24 or the leading part side thread part 44a, that is the number of ridges 18 having the full shape is indicated in the column of "Number of full ridges".

In FIG. 6, the items in the shaded blocks do not satisfy the requirements of the first aspect or the third aspect according to the present application. That is, the test sample No. 1 is a conventional sample in which the lead of the helical flute 20 is constant across the entire length, and the test sample No. 2 is a comparative sample prepared by forming a tapered part 26 in the test sample No. 1. The test sample No. 3 is a comparative sample having a gradually decreased lead part in place of the gradually increased lead part 20b, and the test sample No. 4 is a comparative sample, though having the gradually increased lead part 20b, the lead of which at the flute terminal part is less than 1.2×LA.

The test samples No. 5 to No. 7, No. 10 to No. 12, No. 14, and No. 15 are all samples according to the present invention that satisfy the requirements of the first aspect of the present invention. Among them, the test samples No. 6 and No. 15, though having the tapered part 26, do not satisfy the requirement of the third aspect of the present invention in the number of ridges of the full thread part 24.

The test sample No. 8 is a conventional sample, not having the constant lead part 20a, in which the lead gradually increases toward the shank 12 across the entire length of the helical flute 20. The test samples No. 9 and No. 13 are comparative samples which have the constant lead part 20a not satisfying the requirement of the first aspect of the present invention in the axial direction thereof. The test sample No. 16 is a sample according to the present invention that satisfies all requirements of the first aspect and the fourth aspect of the present invention in which the chamfer angle 4 is selected to be 45° and the chamfer height Hmen is selected to be 50% of the thread height Hneji.

As is clear from the test results shown in FIG. 6, with all of the test samples No. 5, No. 7, No. 10 to 12, No. 14, and No. 16 which are the samples according to the present invention that satisfy the requirements of the first aspect, third aspect, or fourth aspect, the tapping can be continued for not less than i.e., more than 500 holes.

In contrast, with the test samples No. 1 to No. 4, No. 8, No. 9, and No. 13 which are conventional samples or comparative samples, breakage of the spiral tap occurred at not more than 100 holes. The test samples No. 6 and No. 15, though satisfying the requirements of the first aspect of the present invention, do not satisfy the requirements of the third aspect, the test sample No. 6 in which the number of full ridges is selected to be 0.5, did not exhibit an adequate guiding action. Thus, the internal thread became enlarged in the first hole, resulting in out of gauge.

Meanwhile, the test sample No. 15 in which the number of full ridges is selected to be 6, the spiral tap broke at the 497th hole, and thus exhibited a durability close to that of other samples according to the present invention. In all cases, breakage of the spiral tap occurred after twining of the chips with the spiral tap. Judging from this, the biting-in of the chips is considered to be cause of the breakage.

Figure 7A:
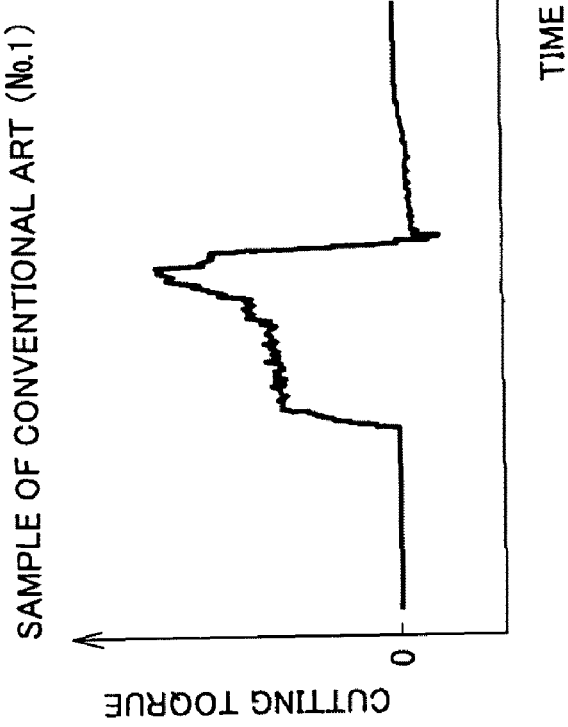
FIG. 7 is a graph comparatively showing results of cutting torques measured during tapping conducted using test samples No. 1 and No. 7 of FIG. 6.
Figure 7B:
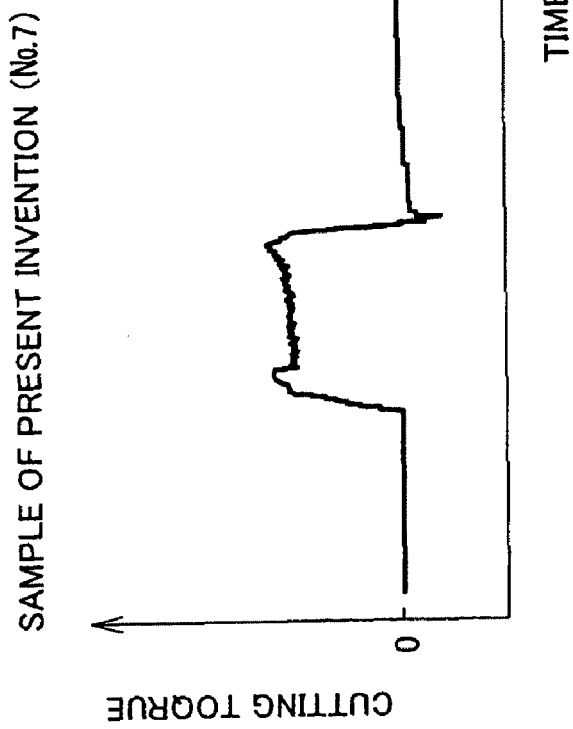

In FIG. 7, the measured results of the cutting torque during tapping are compared for the test sample No. 7 according to the present invention (FIG. 7A), and the test sample No. 1 according to a conventional sample (FIG. 7B). As can be observed from this graph, with the sample according to the present invention, the cutting torque is kept substantially constant until the tapping is completed. To the contrary, with the conventional sample, the cutting torque becomes high in the middle of the cutting working due to accumulation of chips in the helical flutes, etc.

Figure 8A:
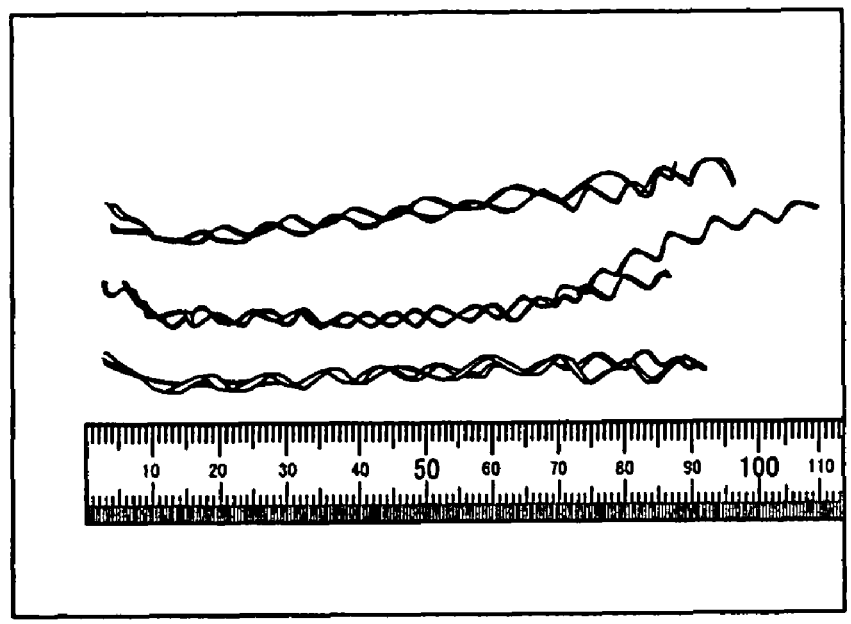
FIG. 8 is a set of photographs comparatively showing chips formed during the tapping conducted using the test samples No. 7 and No. 8 of FIG. 6.
Figure 8B:
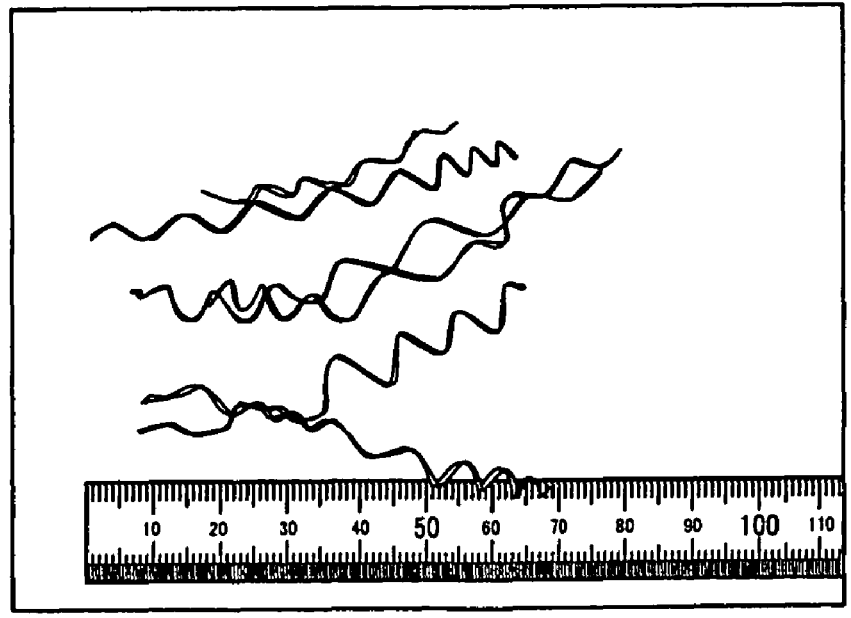

In FIG. 8, photographs of the chips obtained are compared between tapping using the test sample No. 7 according to the present invention (FIG. 8A), and that using the test sample No. 8 according to a conventional sample (FIG. 8B). With the sample according to the present invention, the chips curl up compactly to take a substantially constant curled shape. To the contrary, with the comparative sample, the curls vary widely in size to have the irregular curled shapes.

As described above, with the spiral taps 10 and 40 according to the present invention, each of the helical flutes 20 has the constant lead part 20a at the tap tip end and the gradually increased lead part 20b that is gradually increased in the lead. The constant lead part 20a, having an axial length in the range of 0.3×LA to 1.2×LA, includes at least the entire leading part 22, so that not only the cutting performance of the cutting edge 28 at the leading part 22 becomes stable but the shape of chips (curled shape, etc.) becomes stable.

In the constant lead part 20a, owing to the smallest lead and the large helix angle, the rake angle of the cutting edge 28 is large, so that an excellent cutting quality is obtained and the chips are curled satisfactorily. Meanwhile, in the gradually increased lead part 20b, owing to the increased lead thereof toward the shank 12, the chips are rapidly discharged toward the shank 12 and the chip clogging is suppressed satisfactorily. That is, the excellent cutting performance and the chip discharge performance rendered by the gradually increased lead are highly stabilized by presence i.e., provision of the constant lead part 20a. Consequently, the cutting torque is reduced, so that breakage of the spiral tap, etc., are suppressed, and the durability thereof is further improved.

Also, with the present embodiment, both the constant lead part 20a and the gradually increased lead part 20b of the helical flute 20 are formed by the grinding abrasive 36 being oriented to intersect the axis O of the tap blank 34 by the constant inclination angle α. Thus, in comparison with a case where the orientation of the grinding abrasive 36 is varied depending on the variation of the lead, the helical flute 20 can be worked simply and cheaply. In addition, in the gradually increased lead part 20b, the flute width increases toward the flute terminal part at side of the shank 12, space for the chip discharging is widened and chip clogging is suppressed more effectively.

The spiral tap 10 shown in FIG. 1 has the tapered part 26 at which the external thread or ridges is removed in a tapering manner so that the diameter decreases from the full thread part 24 with 1 to 5 ridges toward the shank 12. Accordingly, a predetermined gap is formed between the tapered part 26 and the valley of the internal thread 104, which suppresses the biting-in of the chips, when the full thread part 24 and the tapered part 26 are screwed into the threaded hole formed by the leading part 22. Consequently, chipping of the cutting edge, increase of the cutting torque, and breakage of the spiral tap, etc., all caused by the biting-in of the chips are suppressed, so that the durability of the spiral tap 10 is further improved.

The full thread part 24 of the full thread shape has more than 1 ridge and not more than 5 ridges, and in the tapered part 26, the foot parts remained after removal of the external thread or ridges has the same shapes as the original ridge shape. Accordingly, an excellent guiding action (lead feeding) is obtained by the full thread part 24 and the tapered part 26, so that the internal thread 104 can be cut in a high working precision.

With the spiral tap 40 shown in FIG. 5, the chamfer part 46 is formed at the rake surface of the cutting edge 28 of the shank side thread part 44b, which, in the full thread part 44 of the thread part 42, is positioned at side of the shank 12. Accordingly, the chips are readily pushed out toward an outer circumference along the chamfer part 46, so that the biting-in of the chips during screwing of the full thread part 44 into the threaded hole formed by the leading part 22 is suppressed. Consequently, the chipping of the cutting edge, increase of the cutting torque, and breakage of the spiral tap, etc., all caused by the biting-in of the chips are suppressed. In particular, the cutting edge strength is increased by the chamfer part 46, which prevents the chipping of the cutting edge more effectively together with suppression of the biting-in of the chips. Thus, durability of the spiral tap 40 is further improved.

Of the full thread part 44 of the thread part 42, the leading part side thread part 44a at side of the tip end has the original, full thread or ridges shape, which succeeds to leading part 22 and has more than 1 ridge and not more than 5 ridges. In addition, the shank side thread part 44b provided with the chamfer part 46 is kept in the original thread shape at parts except for a part of the cutting edge 28. Accordingly, an excellent guiding action (lead feeding) is rendered over the entire range of the full thread part 44, which leads to the cutting of the internal thread in the high working precision.

With the spiral tap 40, the flat and planar chamfer is formed as the chamfer part 46. In place of this, a rounded chamfer of arcuate shape may be formed, which is smoothly connected with both the rake surface (helical flute 20) of the cutting edge 28 and the crest of the thread 18 in a section perpendicular to the helical flute 20.

The embodiments of the present invention were described in detail heretofore based on the drawings. Noted that these are no more than the examples. The present invention can be carried out in modes in which various changes and modifications are added based on the knowledge of those skilled in the art.

INDUSTRIAL APPLICABILITY

With the spiral tap according to the present invention, the helical flute has the constant lead part and the gradually increased lead part, and the constant lead part includes at least the leading part. Accordingly, both the cutting performance of the cutting edge at the leading part and the shape of chips (curled shape, etc.) become stable. That is, the excellent cutting performance and the chip discharge performance rendered by the gradually increased lead are highly stabilized owing to presence of the constant lead part. Consequently, the spiral tap is prevented from breakage to provide the excellent durability, and is suitably used for the tapping, that is the threading of the internal thread.

What is claimed is:

1. A spiral tap including a thread part being provided with an external thread corresponding to an internal thread to be worked, a helical flute dividing the external thread, and a cutting edge formed along the helical flute,
   when the thread part is screwed into a prepared hole formed in a workpiece, the cutting edge cutting the internal thread on an inner circumferential surface of the prepared hole, and chips being discharged toward a shank via the helical flute,
   wherein the helical flute is formed with a constant lead LA in a constant lead part provided at a tip end, and is connected smoothly to the constant lead part with a lead gradually increased to be not less than 1.2×LA at a flute terminal part, in a gradually increased lead part extending from the constant lead part to a flute terminal at side of the shank, and
   the constant lead part has an axial length thereof ranging from 0.3×LA to 1.2×LA at the tip end.

2. The spiral tap according to claim 1, wherein the constant lead part is worked by rotating a tap blank about an axis thereof at a constant rotation speed with moving the tap blank at a constant feeding speed in an axial direction thereof relative to a grinding abrasive oriented to intersect the axis of the tap blank by a constant inclination angle, and
   the gradually increased lead part is worked by varying the feeding speed of the tap blank relative to the rotation speed, so that the lead gradually increases toward the flute terminal part with a flute width increased toward the flute terminal part, relative to the grinding abrasive in the orientation intersecting the axis by the same inclination angle as that during working of the constant lead part.

3. The spiral tap according to claim 2, wherein the thread part includes the leading part, a full thread part succeeding to the leading part and having more than one ridge and not more than five ridges, and a tapered part in which ridges of the external thread are removed from the full thread part toward the shank in a tapering manner to be decreased in diameter.

4. The spiral tap according to claim 2, wherein the full thread part of the thread part is provided with a chamfer part, with leaving a leading part side thread part disposed at the tip end succeeding to the leading part and having more than one ridge and not more than five ridges, the chamfer part being provided on a rake surface of the cutting edge at a shank side thread part positioned at side of the shank than the leading part side thread part, to be retreated in a circumferential direction toward a crest of the ridges.

5. The spiral tap according to claim 1, wherein the thread part includes a leading part, a full thread part succeeding to the leading part and having more than one ridge and not more than five ridges, and a tapered part in which ridges of the external thread are removed from the full thread part toward the shank in a tapering manner to be decreased in diameter.

6. The spiral tap according to claim 1, wherein the full thread part of the thread part is provided with a chamfer part, with leaving a leading part side thread part disposed at the tip end succeeding to the leading part and having more than one ridge and not more than five ridges, the chamfer part being provided on a rake surface of the cutting edge at a shank side thread part positioned at side of the shank than the leading part side thread part, to be retreated in a circumferential direction toward a crest of the ridges.

* * * * *